United States Patent
Mo et al.

(10) Patent No.: US 8,126,069 B2
(45) Date of Patent: Feb. 28, 2012

(54) RE-TRANSMISSION IN A MIMO COMMUNICATION SYSTEM

(75) Inventors: Ronghong Mo, Singapore (SG); Ping Luo, Singapore (SG); Poy Boon Tan, Singapore (SG); Katsuhiko Hiramatsu, Kanagawa (JP)

(73) Assignee: Panasonic Corporation, Osaka (JP)

( * ) Notice: Subject to any disclaimer, the term of this patent is extended or adjusted under 35 U.S.C. 154(b) by 254 days.

(21) Appl. No.: 12/306,294

(22) PCT Filed: Jun. 23, 2006

(86) PCT No.: PCT/SG2006/000167
§ 371 (c)(1),
(2), (4) Date: Nov. 12, 2009

(87) PCT Pub. No.: WO2007/149047
PCT Pub. Date: Dec. 27, 2007

(65) Prior Publication Data
US 2010/0061475 A1 Mar. 11, 2010

(51) Int. Cl.
*H04K 1/10* (2006.01)
(52) U.S. Cl. .................................................. 375/260
(58) Field of Classification Search .......... 375/260–261, 375/267, 285, 316, 340, 342, 347; 370/334, 370/347; 714/748, 751
See application file for complete search history.

(56) References Cited

U.S. PATENT DOCUMENTS

| 7,072,307 | B2* | 7/2006 | Tong et al. | 370/253 |
| 7,391,755 | B2* | 6/2008 | Gopalakrishnan et al. | 370/334 |
| 7,397,864 | B2* | 7/2008 | Tarokh et al. | 375/299 |
| 7,580,427 | B2* | 8/2009 | Yun et al. | 370/477 |
| 8,000,410 | B2* | 8/2011 | Wengerter et al. | 375/298 |
| 2004/0264593 | A1* | 12/2004 | Shim et al. | 375/267 |
| 2007/0115864 | A1* | 5/2007 | Bar-Ness et al. | 370/278 |
| 2009/0279631 | A1* | 11/2009 | Chen et al. | 375/267 |

FOREIGN PATENT DOCUMENTS

EP 1643661 A2 4/2006
WO WO 2006/028352 A1 3/2006

OTHER PUBLICATIONS

Sun, Haitong et al., "Progressive Linear Precoder Optimization for MIMO Packet Retransmissions", IEEE Journal: Selected Areas in Communications, vol. 24, Issue 3, Mar. 6, 2006, pp. 448-456.
Wolniansky et al., "V-BLAST: an architecture for realizing very high data rates over the rich-scattering wireless channel", 1998 URSI International Symposium on Signals, Systems and Electronics, Pisa, Italy, Sep. 29 to Oct. 2, 1998, 6 pages.

* cited by examiner

*Primary Examiner* — Khanh C Tran
(74) *Attorney, Agent, or Firm* — Brinks Hofer Gilson & Lione

(57) ABSTRACT

A method for re-transmission in a multiple-input multiple-output (MIMO) communication system, the method comprising: performing spatial mapping of one or more retransmitted data streams and one or more newly transmitted data streams, wherein the spatial mapping comprises switching bits between the re-transmission data streams and the new transmission data streams.

17 Claims, 6 Drawing Sheets

16-QAM constellation with Gray encoding

16-QAM bit-by-bit demapping

RE-TRANSMISSION IN A MIMO COMMUNICATION SYSTEM

FIELD OF INVENTION

This invention relates to a method for re-transmission in a multiple-input multiple-output (MIMO) communication system, and to a transmitter and a receiver for re-transmission in a MIMO communication system.

BACKGROUND OF INVENTION

In wireless communication systems, a technique used for improving system throughput is the hybrid automatic repeat request (HARQ) technique.

The HARQ technique resends data packets on the detection of errors on the received packets. The HARQ process is activated when the transmission of a new data packet is launched. In a typical implementation of a HARQ process, each packet to be transmitted is first attached with a cyclic redundancy check (CRC) for the purpose of error detection. At the receiver, the contents of each packet are validated through the use of CRC code. If the packet cannot pass the CRC validation, the receiver feeds back a non-acknowledgment (NACK) signal to the transmitter to request a retransmission. At the receiver, the received retransmitted packets and the received original packets are further combined to improve the system throughput. If the received packet is decoded and passes the CRC validation, an acknowledgement (ACK) signal will be sent to the transmitter to acknowledge the successful decoding of the packets and request the transmission of a new data packet. The HARQ process might comprise more than one transmission. The HARQ process will be terminated if the transmitter receives an ACK signal for the transmitted data packet or a predefined maximum number of retransmissions (e.g. 4 retransmissions) is reached.

Two well-known protocols to implement a HARQ process are Chase combining protocol and Incremental Redundancy (IR) protocol.

In Chase combining protocol, the same data packet is retransmitted on a repeat request.

In IR protocol, the originally transmitted packets include system information and some parity information. On the detection of decoding errors, parity information different from that contained in the original packet will be retransmitted to provide more redundancy to assist the decoding of the system information. In contrast to the Chase packets transmitted by the Chase combining protocol, the retransmitted IR packets are not the repetition of the originally transmitted packets.

The capacity of wireless communication systems can be further enhanced by simultaneously transmitting multiple data streams over a multiple input multiple output (MIMO) communication system that employs multiple ($N_T$) transmit antennas and multiple ($N_R$) receive antennas through the use of spatial multiplexing (SM). A well-known technique to increase the capacity through SM is discussed in prior art reference V-BLAST: an architecture for realising very high data rates over the rich-scattering wireless channel" by P W Wolniansky et al in the published papers of the 1998 URSI International Symposium on Signals, Systems and Electronics, Pisa, Italy, Sep. 29 to Oct. 2, 1998 (hereinafter referred to as VBLAST).

MIMO techniques can be used in conjunction with orthogonal frequency division multiplexing (OFDM) to achieve efficient spectral utilization for transmissions over frequency selective fading channels, by transferring frequency selective fading channels into a set of parallel frequency-flat fading and orthogonal subchannels overlapping each other.

In MIMO communication systems, the data streams transmitted over different transmit antennas normally have various error performance levels since each data stream experiences different degrees of link conditions. It is unlikely that all the data streams experience decoding errors simultaneously, especially if a large number of antennas are employed.

The HARQ technique making use of the antenna diversity could be able to increase the throughout of a MIMO system, by employing antenna dependent HARQ transmission scheme, where independent HARQ processes are used for individual data streams transmitted independently from different antennas. For instance, at the transmitter, each of the multiple data streams is attached with an independent CRC code. At the receiver, each of the decoded data streams goes through independent CRC validation and the receiver acknowledges each data stream by sending an indicative signal (ACK/NACK signal) back to the transmitter. The transmitter then decides from the indicative signals which data streams need to be retransmitted. System throughput is improved because only the transmit data streams receiving NACK signals will be retransmitted, or only the antennas (unreliable antennas) transmitting these particular data streams receiving NACK signals will perform retransmissions, while the transmit antennas transmitting data streams receiving ACK signal (reliable antennas) will transmit new data streams.

Normally, in order to reduce the number of retransmissions, the retransmitted data streams have higher requirement on transmission quality than the newly transmitted data streams. The higher the number of retransmissions required is, the lesser the system throughput will be. It is therefore desirable to reduce the number of retransmissions.

A need therefore exists to provide a method and system for re-transmission in a multiple-input multiple-output (MIMO) communication system that seeks to reduce the number of retransmissions required and improve the system throughput.

SUMMARY OF INVENTION

In accordance with an aspect of the present invention, there is provided a method for re-transmission in a multiple-input multiple-output (MIMO) communication system, the method comprising: performing spatial mapping of one or more retransmitted data streams and one or more newly transmitted data streams, wherein the spatial mapping comprises switching bits between the re-transmission data streams and the new transmission data streams.

The method may further comprise bit to symbol mapping for generating modulated symbols for transmission, wherein the data bits of the one or more retransmitted data streams and the one or more newly transmitted data streams are switched such that the data bits of the retransmitted data stream are mapped to the MSB bits of the modulated symbols transmitted over both reliable and unreliable antennas.

The reliable antennas may be the antennas from which the data streams transmitted in a previous transmission interval receive an ACK signal fed back from a receiver.

The unreliable antennas may be the antennas from which the data streams transmitted in a previous transmission interval received a NACK signal feedback from the receiver.

The bit to symbol mapping may be performed using Quadrature Amplitude Modulation (QAM).

The reliable antenna over which some of the data bits of the re-transmitted data streams are transmitted may be an antenna least correlated with the antenna over which the data stream transmitted in a previous transmission interval received a NACK signal feedback from the receiver.

The method may further comprise performing, at the receiver, CRC validation on the decoded data streams to determine a HARQ status comprising ACK or NACK signal.

In accordance with another aspect of the present invention, there is provided a transmitter for re-transmission in a multiple-input multiple-output (MIMO) communication system, the transmitter comprising: a spatial mapping module for performing spatial mapping of one or more re-transmission streams and one or more new transmission streams, wherein the spatial mapping module switches bits between the re-transmission data streams and the new transmission data streams.

The transmitter may further comprise a bit to symbol mapping module for generating modulated symbols for transmission, wherein the data bits of the one or more retransmitted data streams and the one or more newly transmitted data streams are switched such that the data bits of the retransmitted data stream are mapped to the MSB bits of the modulated symbols transmitted over both reliable and unreliable antennas.

The reliable antennas may be the antennas from which the data streams transmitted in a previous transmission interval receive an ACK signal fed back from a receiver.

The unreliable antennas may be the antennas from which the data streams transmitted in a previous transmission interval received a NACK signal feedback from the receiver.

The bit to symbol mapping may be performed using Quadrature Amplitude Modulation (QAM).

The reliable antenna over which some of the data bits of the re-transmitted data streams are transmitted may be an antenna least correlated with the antenna for which the data stream transmitted in a previous transmission interval received a NACK signal feedback from the receiver.

In accordance with yet another aspect of the present invention, there is provided a receiver for re-transmission in a multiple-input multiple-output (MIMO) communication system, the receiver comprising: a spatial de-mapping module for performing spatial de-mapping of one or more re-transmission streams and one or more new transmission streams, wherein the spatial de-mapping module switches bits of symbols received to recover the re-transmission data streams and the new transmission data streams.

The data bits of the symbols transmitted from both reliable and unreliable antennas may be switched such that the re-transmission data streams are recovered from MSB bits of the symbols.

The symbols may be based on Quadrature Amplitude Modulation (QAM).

The receiver may further comprise a CRC validation module for performing CRC validation on the decoded data streams to determine an HARQ status comprising ACK or NACK signal.

BRIEF DESCRIPTIONS OF THE DRAWINGS

These and other features, objects and advantages of the present invention will be better understood and readily apparent to one of ordinary skills in the art from the following written description, used in conjunction with the attached drawings, in which.

DETAILED DESCRIPTION OF PREFERRED EMBODIMENTS

An example embodiment of the present invention will now be described with reference to the drawings.

Figure 1:
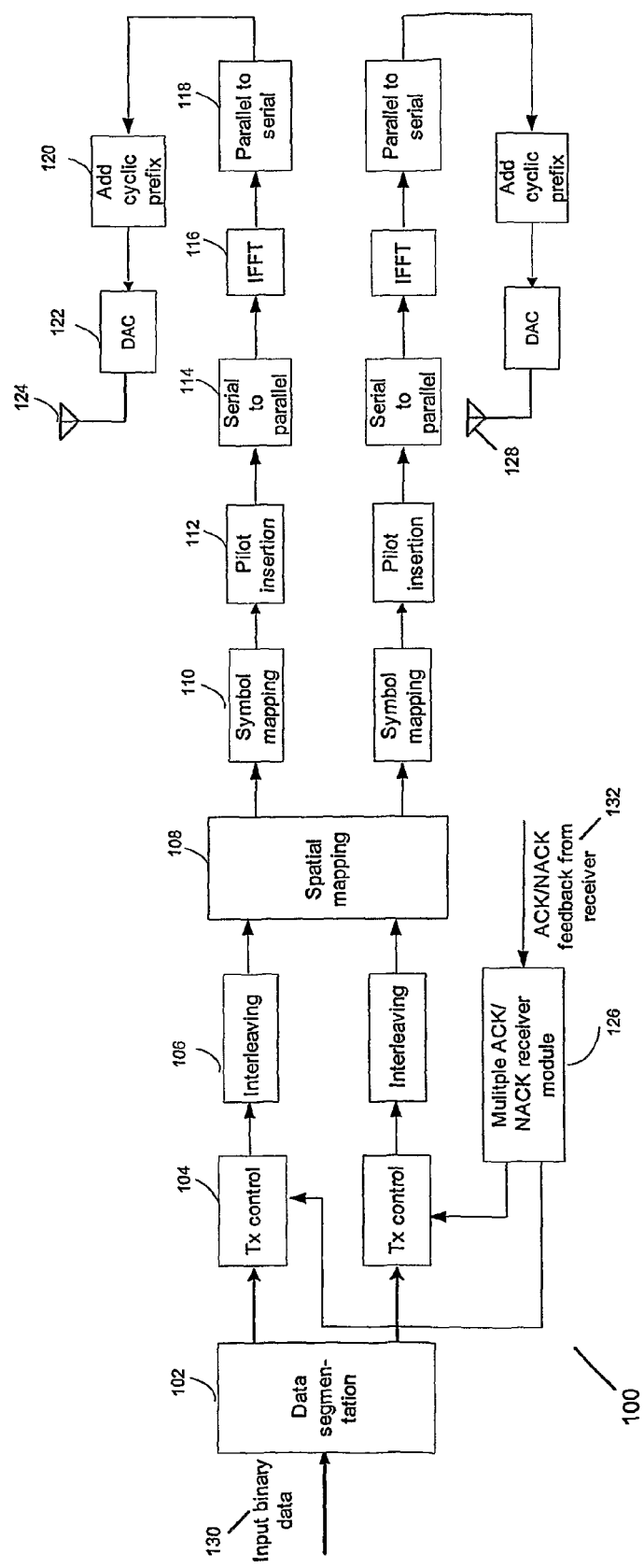
FIG. 1 is a block diagram of a transmitter for a MIMO OFDM communication system.

FIG. 1 shows a transmitter 100 of a multiple-input multiple-output (MIMO) communication system that utilizes orthogonal frequency division multiplexing (i.e. a MIMO-OFDM system), and employs HARQ techniques. The transmitter 100 has two transmit antennas 124 and 128. It is appreciated that the transmitter 100 can be extended to comprise multiple ($N_T$) transmit antennas.

At the transmitter 100, data processing of the input binary data 130 is performed on individual transmit antenna chains. Each of the antenna chains is allocated an independent HARQ process and thus goes through independent CRC attachment at the transmitter and CRC validation at the receiver. In the example embodiment, a transmit antenna chain for the transmit antenna 124 comprises a data segmentation module 102, a transmitter control module 104, an interleaving module 106, a multiple input spatial mapping module 108 shared with other transmit antenna chains, a symbol mapping module 110, a pilot insertion module 112, a serial to parallel converter 114, an Inverse Fast Fourier Transform (IFFT) module 116, a parallel to serial converter 118, a cyclic prefix attachment module 120, and a Digital to Analogue Converter 122.

According to the usage of the MIMO spatial multiplexing technique, independent data streams are transmitted over different transmit antennas 124 and 128. Input binary data 130 is firstly segmented into a number of data streams ($N_T$) by the data segmentation module 102. In the example embodiment, $N_T=2$. Each segmented data stream, for instance, in the transmit antenna chain for transmit antenna 124, is then passed into the transmitter control module 104 together with a HARQ status 132 (i.e. an ACK/NACK signal fed back from the receiver to the transmitter via control channels) that is received from a multiple ACK/NACK receiver module 126.

Depending on the HARQ status 132, different data processing is performed on the input data stream output from the data segmentation module 102 in the transmitter control module 104. The functional blocks of the transmitter control module 104 are described in details in FIG. 3A and FIG. 3B.

Figure 3A:
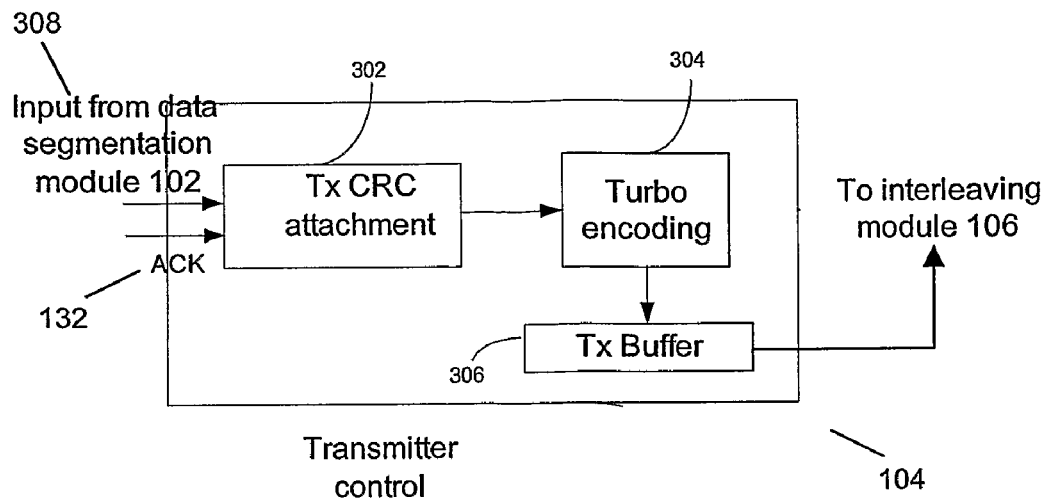
FIG. 3A illustrates functional blocks of a transmitter control module when a positive acknowledgement (ACK) is fed back to a transmit antenna.

FIG. 3A shows the functional blocks and data flow of the transmitter control module 104 when the HARQ status 132 is a positive acknowledgement or ACK.

Since an ACK signal is an indication that the previous data transmission is successfully decoded, new data stream is to be processed and transmitted through this antenna chain. In this case, the transmitter control module 104 will receive new input data stream 308 from the data segmentation module 102. CRC attachment is then performed on the new input data stream 308 by a CRC attachment module 302. Next, Turbo channel encoding is performed on the input data stream 308 through a Turbo encoding module 304. It is appreciated that other channel encoders besides Turbo encoder can be used for the channel encoding at this stage. The coded data output from the Turbo encoder 304 contains system information and parity information. The coded data is divided into multiple packets and stored in the transmitter buffer 306. One of the multiple packets contains system information and some parity information and is transmitted in the original transmission, while the rest of the packets, which contain different parity information only, are used for the events when retransmissions are requested. Depending on whether Chase combining protocol or IR protocol is used for retransmissions, different packet is extracted from the transmitter buffer and transmitted. The data stream (packet) to be transmitted will be sent to an interleaving module 106.

Figure 3B:
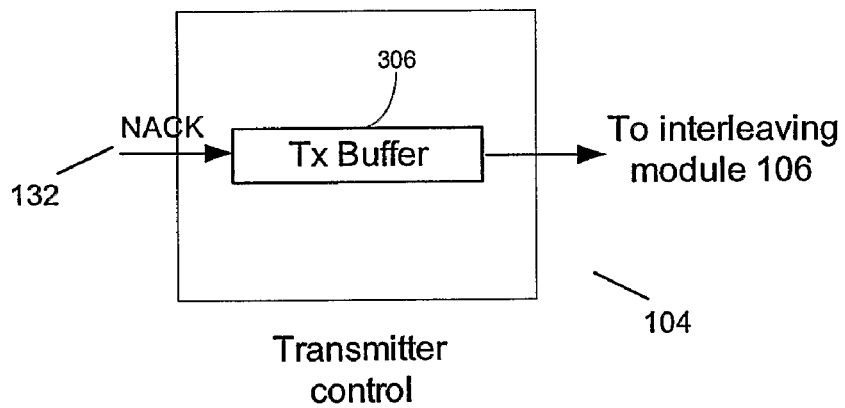
FIG. 3B illustrates functional blocks of a transmitter control module when a negative acknowledgement (NACK) is fed back to a transmit antenna.

FIG. 3B shows the functional blocks and data flow of the transmitter control module 104 when the HARQ status 132 is a negative acknowledgement or NACK.

NACK indicates that a previous transmission is unsuccessful and a previously transmitted data stream needs to be retransmitted. In this case, the transmitter control module 104 will not receive any new data stream from the data segmentation module 102. Instead, the transmitter buffer 306 will go to the transmitter buffer 306 to extract the data packet for retransmission, depending on the retransmission protocol (Chase combining protocol or IR protocol). The data stream to be retransmitted is then sent to the interleaving module 106.

Referring back to FIG. 1, the interleaving module 106 is used to reorder the data bits of the data stream output from the transmitter buffer control module 104 so that burst errors in the data may be reduced.

After interleaving, the output data stream is passed to the spatial mapping module 108.

After spatial mapping has been performed, the output data stream of the spatial mapping module 108 is passed to the symbol mapping module 110, which carries out bit-to-symbol mapping on the output data stream of the spatial mapping module 110 based on various modulation schemes, for example 16-QAM, 64-QAM or the like.

In the example embodiment, the modulation scheme used for illustration is 16-QAM. For better understanding of the spatial mapping and bit to symbol mapping process, before moving to the description on the rest of functional blocks of FIG. 1, the constellations of 16-QAM is first described in detail with reference to FIG. 4 and FIG. 5.

Figure 4:
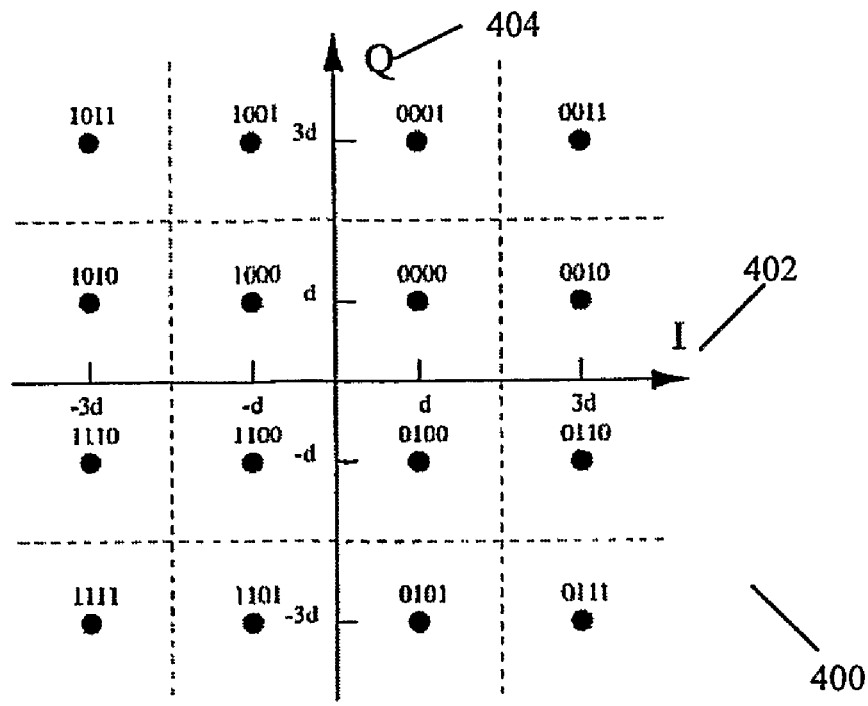
FIG. 4 illustrates the constellations of 16-QAM (Quadrature Amplitude Modulation) with gray mapping.

FIG. 4 illustrates the constellations 400 of square 16-QAM with gray mapping which are utilized in the example embodiment. During the bit to symbol mapping of square 16-QAM the first and the third bits of the symbol are mapped to an in-phase (I) branch 402, while the second and the fourth bits of the symbol are mapped to a quadrature (Q) branch 404. The separate I and Q components are then gray mapped by assigning the bits 01, 00, 10 and 11 to the different amplitude levels 3d, d, −d and −3d respectively. The first bits of the I and Q branches are considered MSB (Most Significant Bit) bits, while the second bits of the I and Q branches are considered LSB (Least Significant Bit) bits.

Figure 2:
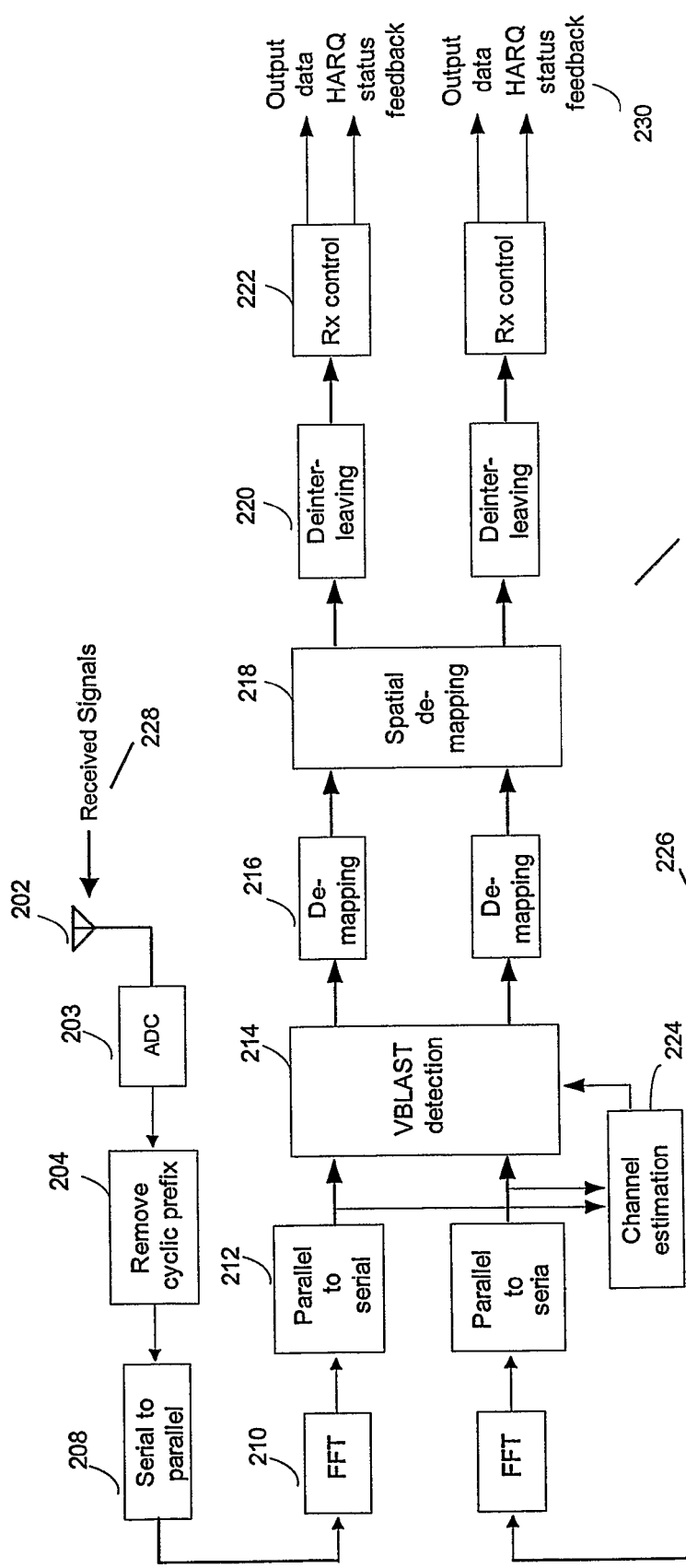
FIG. 2 is a block diagram of a receiver for a MIMO OFDM communication system.
Figure 5:
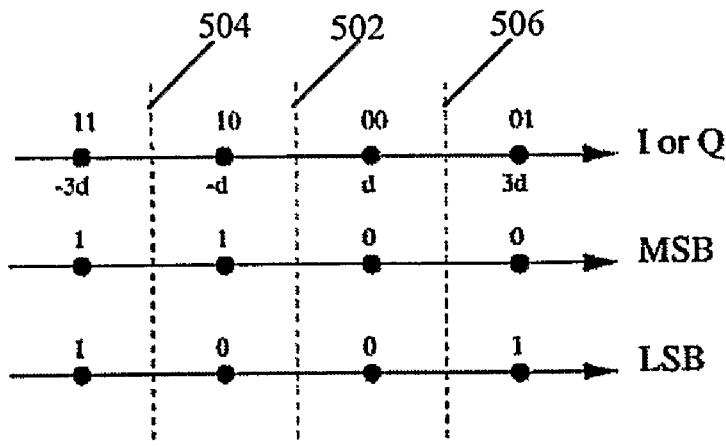
FIG. 5 illustrates the bit-by-bit de-mapping of 16-QAM.

FIG. 5 illustrates the bit-by-bit de-mapping procedure of 16-QAM for I and Q branches that is performed by the De-mapping module 216 (FIG. 2). Viewing FIG. 5 from left to right, the second dash line 502 shows the decision region boundary for MSB bits, while the first and the third dash lines, 504 and 506 respectively, show the decision region boundaries for LSB bits. It can be seen that the MSB bits have higher error protection than the LSB bits. Details of FIG. 2 will be described below.

Taking 16-QAM as an example modulation scheme, the spatial mapping process and bit to symbol mapping process performed by the spatial mapping module 108 (FIG. 1) and symbol mapping module 110 (FIG. 1) will now be described with reference to FIGS. 6A and 6B. These processes intend to improve the transmission quality of retransmitted data streams while not to degrade the transmission quality of the newly transmitted data streams.

Figure 6A:
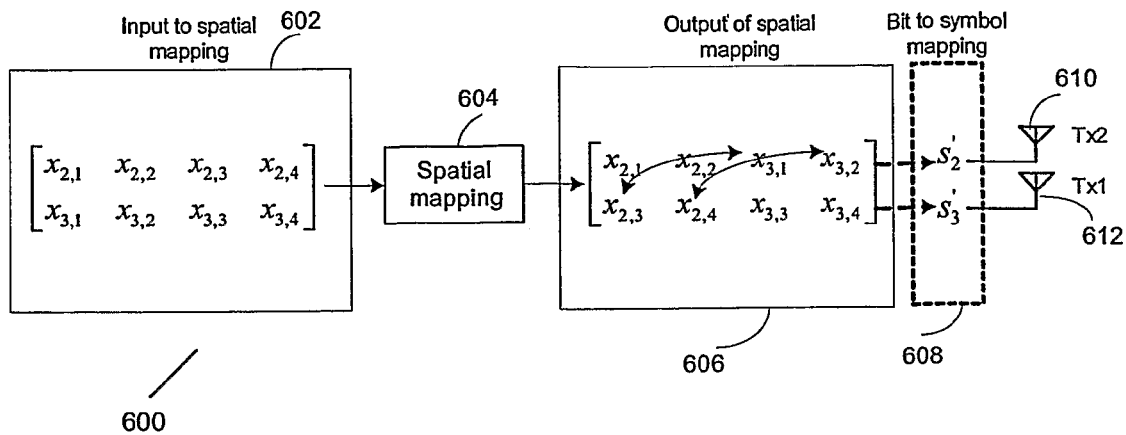
FIG. 6A illustrates spatial mapping for a MIMO OFDM system with two transmit antennas and two receive antenna.

FIG. 6A illustrates the spatial mapping method according to the present invention, for a MIMO OFDM system 600 with two transmit antennas and two receive antenna, in other words, a 2×2 MIMO system. This spatial mapping is performed based on one subcarrier of the OFDM system.

Assuming that, the $k^{th}$ 16-QAM symbol of the $j^{th}$ data stream, $s_j(k)$, is given by equation 1:

$$s_j(k) = \{x_{j,1}(k), x_{j,2}(k), x_{j,3}(k), x_{j,4}(k)\} \quad (1)$$

where $j_{j,i}(k)$ (for $i \in \{1,2,3,4\}$) stands for the binary data bits of the $k^{th}$ symbol from the $j^{th}$ data stream modulated into the first, second, third and fourth bit position of the 16-QAM symbol, $s_j(k)$.

In the example embodiment, two data streams, $s_1$ and $s_2$, have previously been transmitted over antenna 1 (Tx 1) 612 and antenna 2 (Tx 2) 610 of the 2×2 MIMO system 600 respectively. Based on equation 1, $s_1$ is given by, $s_1 = \{x_{1,1} \ x_{1,2} \ x_{1,3} \ x_{1,4}\}$, and $s_2$ is given by, $s_2 = \{x_{2,1} \ x_{2,2} \ x_{2,3} \ x_{2,4}\}$. The time index k is omitted in $s_1$ and $s_2$ in this instance since the description on the spatial mapping onwards is valid for 16-QAM symbols transmitted over all time instants.

$s_1$ is assumed to be decoded successfully and $s_2$ is assumed to be decoded with errors at the receiver. Hence, the transmission of data through antenna 1 612 is considered to be reliable, while the transmission of data through antenna 2 610 is considered unreliable. As $s_2$ is decoded with errors, a NACK signal is sent from the receiver to the transmitter to request for the retransmission of $s_2$. As for $s_1$, an ACK is sent from the receiver to the transmitter to request for the transmission of new data. The ACK/NACK signals can be transmitted over control channels. At the transmitter side, the transmitter can monitor the control channel and decode the ACK/NACK signals.

After receiving the NACK signal for data stream $s_2$, the transmitter control module (104 in FIGS. 1 and 3A) in the transmitter antenna chain for antenna 2 (module 610) extracts data stream from the transmitter buffer of this particular antenna chain (306 in FIG. 3A) for retransmission. The retransmitted data stream for $s_2$ is still denoted by $s_2 = \{x_{2,1} \ x_{2,2} \ x_{2,3} \ x_{2,4}\}$. However, depending on the retransmission protocols (Chase combining protocol or IR protocol), the contents of retransmitted data streams might be different from that of the previous transmissions. On the other hand, after receiving the ACK signal for data stream $s_1$, the transmitter control module (104 in FIGS. 1 and 3A) in the transmit antenna chain for antenna 1 (module 612) inputs a new data stream $s_3$ and prepares it for transmission based on equation 1, $s_3$ is given by $s_3 = \{x_{3,1} \ x_{3,2} \ x_{3,3} \ x_{3,4}\}$.

In FIG. 6A, data 602 represented in a matrix format input to the spatial mapping module 604 (108 in FIG. 1) comprises binary data bits of $s_2$ and $s_3$, where the first row is for $s_2$ and the second row is for $s_3$. During the spatial mapping at the spatial mapping module 604, the data bits, $x_{2,3}$ and $x_{2,4}$, of the retransmitted data stream $s_2$, and the data bits, $x_{3,1}$ and $x_{3,2}$, of the new data stream $s_3$ are switched, in order to improve the transmission quality of $s_2$. After spatial mapping, the Output data 606 of the spatial mapping module 604 is given by, $s'_2=\{x_{2,1}\ x_{2,2}\ x_{3,1}\ x_{3,2}\}$, and $s'_3\{x_{2,3}\ x_{2,4}\ x_{3,3}\ x_{3,4}\}$.

Next, $s'_2$ and $s'_3$ are passed to the symbol mapping module 608 (110 in FIG. 1), which is also known as bit to symbol mapping module, to form modulated symbols based on the modulation scheme (e.g. 16-QAM).

Due to the switching of data bits during spatial mapping process, the bit to symbol mapping is performed on $s'_2$ and $s'_3$ at the symbol mapping module 608, following the 16-QAM mapping method described above. After the bit to symbol mapping, two bits from $s_2$ are mapped to the MSB bit positions of the 16-QAM symbol that is transmitted over the unreliable antenna 2 610, while the other two bits from $s_2$ are mapped to the MSB bit positions of the 16-QAM symbol that is transmitted over the reliable antenna 1 612. On the other hand, two bits from $s_3$ are mapped to the LSB bit positions of the 16-QAM symbol that is transmitted over the unreliable antenna 2 610, while the other two bits from $s_3$ are mapped to the LSB bit positions of the 16-QAM symbol that is transmitted over reliable antenna 1 612. Hence, the 16-QAM symbols transmitted over both antennas 610 and 612 are constructed from both data streams $s_2$ and $s_3$.

The data bits switching performed during spatial mapping advantageously ensures that the subsequent bit to symbol mapping module maps the data bits of $s_2$, which requires higher transmission quality, to the higher error protection MSB positions of the 16-QAM symbols that are sent over the reliable and unreliable antennas 612 and 610. As a result, the overall retransmission quality of $s_2$ is improved.

With regard to $s_3$, overall retransmission quality is not compromised as two bits of $s_3$ are still transmitted over the reliable antenna 1 612 and typically, in wireless environments, channel conditions are very likely to remain unchanged over the adjacent transmission intervals, hence, antenna 1 612, which is transmitting two bits of $s_3$, might still be reliable. Comparing the spatial mapping method employed in the example embodiment with an existing system where the data streams to be transmitted over antenna 1 and 2 are switched, that is, to transmit $s_2$ over the reliable antenna 1 612 and transmit $s_3$ over the unreliable antenna 2 610, the overall retransmission quality of $s_3$ is preserved in the example embodiment.

Figure 6B:
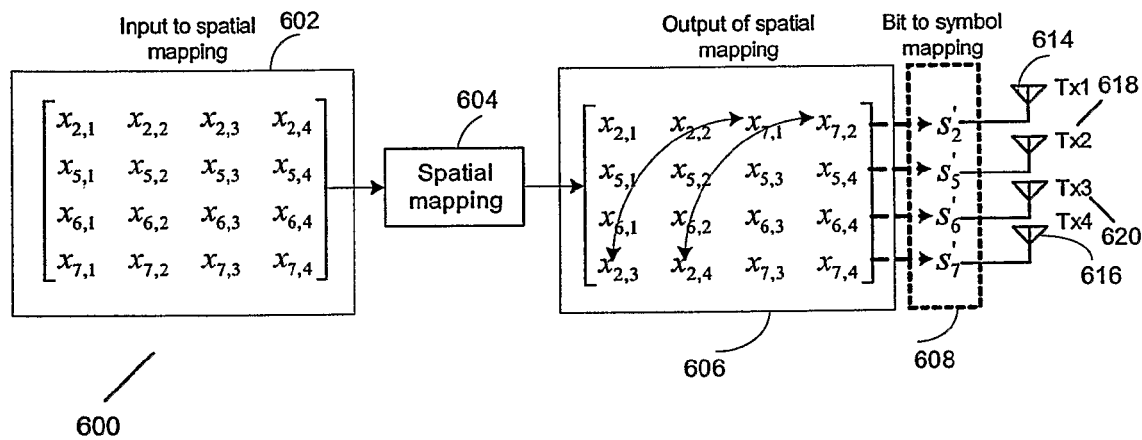
FIG. 6B illustrates spatial mapping for a MIMO OFDM system with four transmit antennas and four receive antenna.

FIG. 6B illustrates utilizing the spatial mapping method of the example embodiment for retransmission of data streams for a 4×4 MIMO system 614. Similar to the previous example, it is assumed that data stream $s_2$ experienced decoding error and the retransmission of $s_2$ is requested. It is also assumed that antenna 1 (Tx1) 614 is considered unreliable and antenna 4 (Tx4) 616 is considered reliable.

During the spatial mapping at the spatial mapping module 604, the data bits, $x_{2,3}$ and $x_{2,4}$, of the retransmitted data stream $s_2$, and the data bits, $x_{7,1}$ and $x_{7,2}$, of the new data stream $s_7$ are switched.

Therefore, during the bit to symbol mapping, the four data bits of $s_2$ are mapped to the MSB bits of the 16-QAM symbols that is transmitted over unreliable antenna 1 (Tx1) 614 and reliable antenna 4 (Tx4) 616 respectively. It is appreciated that data bits, $x_{2,3}$ and $x_{2,4}$ of the retransmitted data stream $s_2$ may be switched with the data bits of the other new data streams, in this case $s_5$ or $s_6$ and sent out via the corresponding antennas Tx2 618 or Tx3 620 respectively, according to the same method as switching with the data bits of the new data stream $s_7$ described above. However, with consideration of spatial correlation between antennas, and that the antenna arrays Tx1 614, Tx2 618, Tx3 620 and Tx4 616 is a linear array, the antenna with least spatial correlation to antenna 1 614, i.e. antenna 4 616, is selected.

From the above discussions, the example embodiments use a spatial mapping method to provide space diversity and symbol mapping diversity and as a result reduce the number of retransmissions, and thus improve the system throughput. The example embodiment advantageously ensures that overall transmission quality of the retransmitted data stream is maintained without reduced compromise on the overall transmission quality of the new data stream.

Referring back to FIG. 1, after symbol mapping at symbol mapping module 110, pilot signals are inserted to the output data stream of the symbol mapping module 110 by a pilot insertion module 112. Pilot signals are used to assist the channel estimation and synchronization for MIMO OFDM at a receiver.

The output data stream from the pilot insertion module 112 is then converted into parallel data streams by a serial to parallel converter 114.

The output parallel data stream of the serial to parallel converter 114 is passed into an N-point IFFT module 116, which performs Inverse Fast Fourier Transform on the parallel data stream to produce parallel time domain data.

The output parallel time domain data of the IFFT module 116 is then converted back to serial data by a parallel to serial converter 118.

Next, cyclic prefixes used for overcoming inter-symbol interference from the preceding OFDM symbol are appended to the beginning of each current OFDM symbol by a cyclic prefix attachment module 120.

The output data stream from the cyclic prefix attachment module 120, which is in the form of digital signals, are then converted to analogue signals by a Digital to Analogue Converter (DAC) 122 and transmitted over a frequency specific radio channel through the transmit antenna 124.

It is appreciated that the data processing steps carried out for the transmit antenna chain for transmit antenna 124 as described can be applied to other transmit antenna chains.

FIG. 2 shows the functional blocks of a receiver 200 of the MIMO-OFDM system. The receiver 200 has two receive antennas 202 and 226. It is appreciated that the receiver 200 can be extended to comprise multiple ($N_R$) receive antennas.

At the receiver 200, processing of the received signal is performed on individual receive antenna chains. In the example embodiment, a receive antenna chain for the receive antenna 202 comprises an Analogue to Digital Converter (ADC) 203, a cyclic prefix removal module 204, a serial to parallel converter 208, a Fast Fourier Transform (FFT) module 210, a parallel to serial converter 212, a multiple input VBLAST detection module 214 shared with other receive antenna chains, a channel estimation module 224, a De-mapping module 216, a multiple input spatial demapping module 218 shared with other receive antenna chains, a De-Interleaving module 220 and a receiver control module 222.

In the receive antenna chain for the receive antenna 202, the received signals 228 received at the receive antenna 202 firstly go through the Analogue to Digital Converter (ADC) 203 to convert the received analogue signals to digital signals.

Next, the cyclic prefixes of the digital signals are removed by the cyclic prefix removal module 204.

The output data samples from the cyclic prefix removal module 204 is passed to the serial to parallel converter 208 for serial to parallel data conversion followed by the N-pint Fast Fourier transform (FFT) module 210 for performing FFT and the parallel to serial converter 212 for parallel to serial data conversion.

The output data stream from the parallel to serial converter 212 is then passed to the VBLAST detection module 214 and the channel estimation module 224. Channel fading gains experienced by the received data stream are estimated at the channel estimation module 224 using the pilot signals that are incorporated in the received data stream. The estimated channel gains obtained in the channel estimation module 224 are passed to the VBLAST detection module 214. The VBLAST detection module 214 is responsible for separating the received data stream into individual transmit data streams, since in the example embodiment, the data streams received at each receive antenna 202 and 226 are comprised of $N_T$ independent signals transmitted from $N_T$ transmit antennas.

After the detection of received data streams, bit to symbol de-mapping of the data stream is performed at the De-mapping module 216 to convert the modulated symbol sequence to a sequence of data bits before passing the sequence of data bits to the spatial de-mapping module 218. The function of the spatial de-mapping module 218 is to recover the detected data streams that have been spatially switched by the transmitter back to their corresponding data streams and positions. For example, the spatial de-mapping module 218 switches the LSB bits of the detected data stream transmitted from the unreliable antenna Tx 2 610 (FIG. 6A) with the MSB bits of the detected data stream transmitted from the reliable antenna Tx 1 612 (FIG. 6A), in "reversing" the mapping previously described with reference to FIG. 6A. Hence the retransmitted data stream is re-constructed by multiplexing the MSB bits of the detected streams transmitted from both the unreliable and reliable antennas in the spatial de-mapping module 218.

Next, de-interleaving of the output data bits of the individual data streams of the spatial de-mapping module 218 is carried out by the de-interleaving module 220. Thereafter, the output data stream of the de-interleaving module 220 is passed to the receiver control module 222, which performs decoding and CRC validation to check the integrity of the decoded data stream and determine the HARQ status 230.

If the decoded data stream fails the CRC validation, a NACK is output from the receiver control module 222 and sent back to the transmitter 100 (FIG. 1) via a control channel to indicate that the data stream needs to be retransmitted.

If the decoded data stream passes the CRC validation, an ACK is output from the receiver control module 222 and sent back to the transmitter 100 (FIG. 1) via a control channel to indicate that new data streams can be processed and transmitted.

Figure 7A:
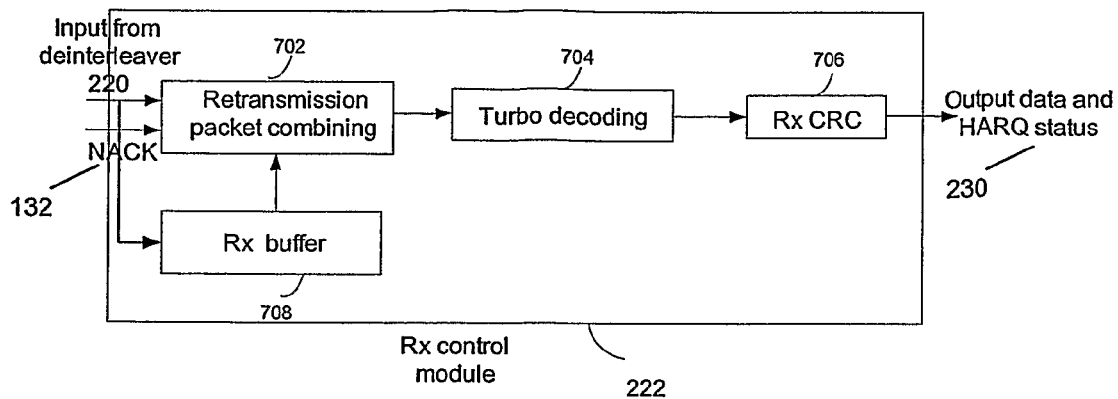
FIG. 7A illustrates functional blocks of a receiver control unit when a negative acknowledgement (NACK) is received after a previous CRC validation.
Figure 7B:
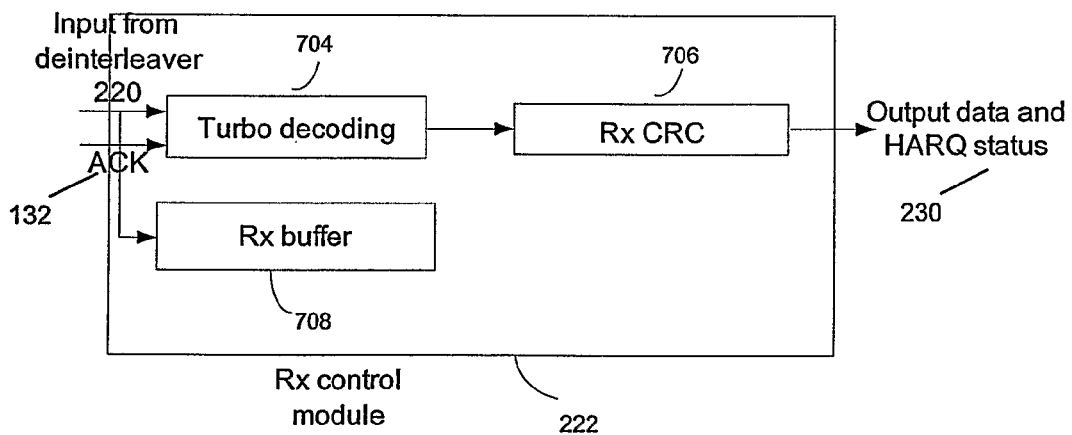
FIG. 7B illustrates functional blocks of a receiver control unit when a positive acknowledgement (ACK) is received after a previous CRC validation.

Depending on the HARQ status of previous decoded data streams, the functional blocks of the receiver control module 222 are described in details in FIG. 7A and FIG. 7B.

FIG. 7A shows the functional blocks and data flow of the receiver control module 222 in the case that the HARQ status 132 (associated with a previously decoded data stream) is a negative acknowledgement or NACK.

When a NACK is signaled for a data stream, the receiver control module 222 first receives the data stream from the de-interleaving module 220 (FIG. 2) and passes the data stream to the retransmission packet combining module 702, and to the receiver buffer 708 for an event that further retransmission is needed. The retransmission packet combining module 702 combines this retransmitted data stream output from the de-interleaving module 220 (FIG. 2) with the data streams which were received in the previous transmissions for this particular HARQ process and were previously stored in the receiver buffer 708 for combining. The output of the retransmission packet combining module 702 is then passed to the Turbo channel decoder 704 for decoding. It is appreciated that other channel decoders may be used depending on the channel encoding techniques used at the transmitter. After channel decoding, a CRC validation module 706 performs CRC validation on the decoded results and generates output data and an HARQ status 230. If the CRC validation is successful, an ACK signal is sent to a transmitter 100 (FIG. 1) to acknowledge the correct reception, otherwise a NACK signal will be sent to the transmitter to request for retransmissions.

FIG. 7B shows the functional blocks and data flow of the receiver control module 222 in FIG. 7A in the case where the HARQ status 132 is a positive acknowledgement or ACK.

The data stream output from the de-interleaving module 220 (FIG. 2) is sent to the Turbo channel decoder 704 for decoding, and to the receiver buffer 708 to update the buffer content for further combination, if necessary. It is appreciated that other channel decoders may be used depending on the channel encoding techniques that are used at the transmitter. After channel decoding, the CRC validation module 706 performs CRC validation on the decoded results. If the CRC validation is successful, an ACK signal is sent to a transmitter 100 (FIG. 1) to acknowledge the correct reception, otherwise a NACK signal will be sent to the transmitter to request for retransmission.

The HARQ status 230, comprising the ACK/NACK signals output from the receiver control module 222 will be fed back to the transmitter (100 in FIG. 1) via control channels to instruct the transmission of either a new data stream or a retransmitted data stream in the next transmission interval. The transmitter (100 in FIG. 1) monitors the control channels and decodes the ACK/NACK signals of each HARQ process.

Example embodiments of the present invention may have the following features and advantages.

The example embodiments of the present invention, which are based on MIMO systems, are capable of simultaneously transmitting multiple data streams over multiple antennas and thus improve spectral efficiency. HARQ techniques employed in the example embodiments are also effective to increase system throughput. The efficient usage of HARQ techniques in the MIMO systems of the example embodiments further enhances the system performance, by mapping the data bits from the retransmitted data streams to the most significant bit (MSB) positions of modulated symbols transmitted over antennas by means of spatial mapping.

Many modifications and other embodiments can be made to the system and its method by those skilled in the art having the understanding of the above described disclosure together with the drawings. Therefore, it is to be understood that the device and its utility is not limited to the above description contained herein only, and that possible modifications are to be included in the claims of the disclosure.

The invention claimed is:

1. A method for re-transmission in a multiple-input multiple-output (MIMO) communication system, the method comprising:
performing spatial mapping of one or more retransmitted data streams and one or more newly transmitted data streams,
wherein the spatial mapping comprises switching bits between the re-transmission data streams and the new transmission data streams.

2. The method as claimed in claim 1, further comprising bit to symbol mapping for generating modulated symbols for transmission, wherein the data bits of the one or more retransmitted data streams and the one or more newly transmitted data streams are switched such that the data bits of the retransmitted data stream are mapped to the MSB bits of the modulated symbols transmitted over both reliable and unreliable antennas.

3. The method as claimed in claim 2, wherein the reliable antennas are the antennas from which the data streams transmitted in a previous transmission interval receive an ACK signal fed back from a receiver.

4. The method as claimed in claim 2, wherein the unreliable antennas are the antennas from which the data streams transmitted in a previous transmission interval received a NACK signal feedback from a receiver.

5. The method as claimed in claim 2, wherein the bit to symbol mapping is performed using Quadrature Amplitude Modulation (QAM).

6. The method as claimed in claim 2, wherein the reliable antenna over which some of the data bits of the re-transmitted data streams are transmitted is an antenna least correlated with the antenna over which the data stream transmitted in a previous transmission interval received a NACK signal feedback from the receiver.

7. A method as claimed in claim 1, the method further comprising:
    performing, at the receiver, CRC validation on the decoded data streams to determine a HARQ status comprising ACK or NACK signal.

8. A transmitter for re-transmission in a multiple-input multiple-output (MIMO) communication system, the transmitter comprising:
    a spatial mapping module for performing spatial mapping of one or more re-transmission streams and one or more new transmission streams,
    wherein the spatial mapping module switches bits between the re-transmission data streams and the new transmission data streams.

9. The transmitter as claimed in claim 8, further comprising a bit to symbol mapping module for generating modulated symbols for transmission, wherein the data bits of the one or more retransmitted data streams and the one or more newly transmitted data streams are switched such that the data bits of the retransmitted data stream are mapped to the MSB bits of the modulated symbols transmitted over both reliable and unreliable antennas.

10. The transmitter as claimed in claim 9, wherein the reliable antennas are the antennas from which the data streams transmitted in a previous transmission interval receive an ACK signal fed back from a receiver.

11. The transmitter as claimed in claim 9, wherein the unreliable antennas are the antennas from which the data streams transmitted in a previous transmission interval received a NACK signal feedback from a receiver.

12. The transmitter as claimed in claim 9, wherein the bit to symbol mapping is performed using Quadrature Amplitude Modulation (QAM).

13. The transmitter as claimed in claim 9, wherein the reliable antenna over which some of the data bits of the re-transmitted data streams are transmitted is an antenna least correlated with the antenna for which the data stream transmitted in a previous transmission interval received a NACK signal feedback from the receiver.

14. A receiver for re-transmission in a multiple-input multiple-output (MIMO) communication system, the receiver comprising:
    a spatial de-mapping module for performing spatial de-mapping of one or more re-transmission streams and one or more new transmission streams,
    wherein the spatial de-mapping module switches bits of symbols received to recover the re-transmission data streams and the new transmission data streams.

15. The receiver as claimed in claim 14, wherein the data bits of the symbols transmitted from both reliable and unreliable antennas are switched such that the re-transmission data streams are recovered from MSB bits of the symbols.

16. The receiver as claimed in claim 14, wherein the symbols are based on Quadrature Amplitude Modulation (QAM).

17. The receiver as claimed in claim 14, further comprising a CRC validation module for performing CRC validation on the decoded data streams to determine an HARQ status comprising ACK or NACK signal.

* * * * *